United States Patent
Nie

(10) Patent No.: US 12,466,736 B2
(45) Date of Patent: Nov. 11, 2025

(54) METHOD AND DEVICE FOR REGENERATING GRANULAR ACTIVATED CARBON BY ARC INITIATION AND DISCHARGE

(71) Applicant: Zhejiang Qizheng Environmental Protection Technology Co. Ltd, Zhejiang (CN)

(72) Inventor: Xin Nie, Zhejiang (CN)

(73) Assignee: Zhejiang Qizheng Environmental Protection Technology Co. Ltd, Hangzhou (CN)

( * ) Notice: Subject to any disclaimer, the term of this patent is extended or adjusted under 35 U.S.C. 154(b) by 677 days.

(21) Appl. No.: 17/871,798

(22) Filed: Jul. 22, 2022

(65) Prior Publication Data

US 2022/0363548 A1 Nov. 17, 2022

(30) Foreign Application Priority Data

Dec. 23, 2021 (CN) .......................... 202111589576.2

(51) Int. Cl.
  *C01B 32/366* (2017.01)
  *H05B 3/03* (2006.01)

(52) U.S. Cl.
  CPC .............. *C01B 32/366* (2017.08); *H05B 3/03* (2013.01)

(58) Field of Classification Search
  CPC ............... C01B 32/366; C01P 2004/60; C01P 2006/10; C01P 2006/82; H05B 3/0004; H05B 3/03; H05B 7/18; H05B 7/20
  See application file for complete search history.

(56) References Cited

U.S. PATENT DOCUMENTS

2024/0189796 A1* 6/2024 Mazzoccoli ........... B01J 20/281

FOREIGN PATENT DOCUMENTS

CN 106040209 A * 10/2016 ............. B01J 20/20

OTHER PUBLICATIONS

Tradeindia, 2025. Granular Activated Carbon Apparent Density: 470 Kilogram Per Cubic Meter (Kg/m3). <https://www.tradeindia.com/products/granular-activated-carbon-c2857823.html> (Year: 2025).*

* cited by examiner

*Primary Examiner* — Brian A Mccaig

(57) ABSTRACT

A method for regenerating granular activated carbon by arc initiation and discharge includes steps of the granular activated carbon continuously flowing through a heating passage, and applying a DC (direct current) to two electrode plates in the heating passage. Under a combined action of conductive Joule heating and arc heat release, the activated carbon heats up rapidly and an adsorbate is pyrolyzed by high temperature, thereby achieving regeneration. Moreover, a device for regenerating granular activated carbon by arc initiation and discharge includes a feeding device, a heating passage, an aggregate device and an adjustable DC power supply. Two ends of the heating passage are connected with the feeding device and the aggregate device respectively; two electrode plates are provided within the heating passage; the two electrode plates are connected with an output positive pole and an output negative pole of the DC power supply respectively.

5 Claims, 2 Drawing Sheets

METHOD AND DEVICE FOR REGENERATING GRANULAR ACTIVATED CARBON BY ARC INITIATION AND DISCHARGE

CROSS REFERENCE OF RELATED APPLICATION

The present invention claims priority under 35 U.S.C. 119(a-d) to CN 202111589576.2, filed Dec. 23, 2021.

BACKGROUND OF THE PRESENT INVENTION

Field of Invention

The present invention relates to the field of heating technology, and more particularly to a method and a device for regenerating granular activated carbon by arc initiation and discharge.

Description of Related Arts

Thermal regeneration is often used to regenerate activated carbon in industry, that is, by heating the saturated activated carbon to a high temperature, the adsorbate of the saturated activated carbon is pyrolyzed, so as to achieve the activated carbon regeneration. At present, the heating method for activated carbon thermal regeneration is combustion boiler heating, which is suitable for general activated carbon, but is serious in energy consumption, huge in heating equipment, low in energy utilization rate, and moreover, consumes primary energy and produces exhaust smoke to pollute the environment. Also, there are electric-driven heating furnaces that use the electric current to generate heat through special electric heating elements, and then transfer the heat to activated carbon, but the heat transfer process from outside to inside produces a lot of energy waste.

Since activated carbon has a certain electrical conductivity, a direct electric heating regeneration method was proposed later, which has the advantage of more efficient and energy-saving, but requires too high resistance of activated carbon, so that the application and development of this method are limited. The direct electric heating method is to directly connect the activated carbon to the circuit for allowing the current to pass through the activated carbon itself, so as to use the resistance heating of the activated carbon itself to achieve spontaneous heating. However, the direct electric heating method requires that the resistivity of activated carbon is very low, otherwise the current under a certain voltage is very small, and the energization power is very low, resulting in failure to heat. However, most of the saturated activated carbon in the actual industry adsorb a large amount of substances, and has very high resistivity. If high voltage is loaded for increasing the power, it may break down and burn the activated carbon. Therefore, it is necessary to further optimize the technical solution to overcome or avoid the above-mentioned defects, so that activated carbon with higher resistivity is also able to be applied.

SUMMARY OF THE PRESENT INVENTION

An object of the present invention is to provide a method and a device for regenerating granular activated carbon by arc initiation and discharge in view of the deficiencies of the prior art, allowing the granular activated carbon to flow continuously, providing the conduction current for the granular activated carbon and triggering arcs, so that through the dual effect of conduction Joule heating and arc heat release, the activated carbon is heated efficiently to achieve high temperature thermal regeneration.

A method for regenerating granular activated carbon by arc initiation and discharge comprises steps of:

the granular activated carbon continuously flowing through a heating passage;

applying a DC (direct current) to two electrode plates in the heating passage, wherein a voltage of the DC is expressed by a voltage formula of $$U = \sqrt{\eta \rho c q_m \Delta T \left(1 + \frac{2q_m}{\alpha + q_m} + \beta d_p\right) \frac{l}{S}},$$

here, $\rho$ is resistivity of the granular activated carbon, c is specific heat capacity of the granular activated carbon, $q_m$ is mass flow of the granular activated carbon in the heating passage, $\Delta T$ is target temperature rise value of regenerated activated carbon, $d_p$ is equivalent particle size of the granular activated carbon, l is distance between the two electrode plates, S is area of each of the two electrode plates, $\eta$ is a dimensionless coefficient in a range of 1 to 5, $\alpha$ is an empirical parameter which is expressed by a formula of $\alpha = xwl\rho_m$ and has a unit of kg/s, here, x is an adjustment parameter with dimension m/s and is in range of 0.002 m/s to 0.01 m/s, w is facing width of the two electrode plates, $\rho_m$ is bulk density of the granular activated carbon, $\beta$ is an empirical parameter in a range of 200 $m^{-1}$ to 800 $m^{-1}$, wherein:

the granular activated carbon tumbles, collides and separates with each other in the heating passage during transportation, electrons are excited to pass through a potential barrier to form field emission and impact ionization, resulting in arc initiation;

the arc initiation is conducive to current conduction and heat release, and greatly reduces the resistance of an activated carbon access circuit, so that under a combined action of conductive Joule heating and arc heat release, the activated carbon heats up rapidly and an adsorbate is pyrolyzed by high temperature, thereby achieving regeneration.

Preferably, a specific measurement process of the bulk density $\rho_m$ of the granular activated carbon comprises steps of (a) placing the granular activated carbon into a 100 mL of graduated cylinder several times, tapping a bottom of the graduated cylinder with a rubber hammer after each placement until a volume of the granular activated carbon reaches 100 mL and no longer decreases; (b) and then weighing out a net weight of the granular activated carbon in the graduated cylinder with an electronic scale; and (c) finally dividing the net weight of the granular activated carbon by the volume of 100 mL to obtain the bulk density of the granular activated carbon.

Preferably, when the voltage of the DC, which is calculated according to the target temperature rise value, is higher than a preset high value (such as 380 V), or when an input power, which is calculated according to the voltage of the DC, exceeds a rated power of a DC power supply, the voltage of the DC and the input power are reduced by reducing the mass flow $q_m$ of the granular activated carbon in the heating passage; on the contrary, when the voltage of the DC, which is calculated according to the target temperature rise value, is lower than a preset low value, an efficiency and a capacity of the granular activated carbon are increased by increasing the mass flow $q_m$, wherein $q_m = vwl\rho_m$, here, v is flow rate of the granular activated carbon in a range of 0.0005 m/s to 0.02 m/s. Therefore, the mass flow $q_m$ is able to be adjusted by controlling the flow rate v of the granular activated carbon, changing the distance l between the two electrode plates and the facing width w of the two electrode plates.

Preferably, the equivalent particle size of the granular activated carbon is in a range of 0.5 mm to 10 mm.

Preferably, a moisture content of the granular activated carbon is less than 5%, the method for regenerating the granular activated carbon by arc initiation and discharge further comprises a step of drying the granular activated carbon before the granular activated carbon continuously flowing through the heating passage.

Also, the present invention provides a device for regenerating granular activated carbon by arc initiation and discharge, which comprises a feeding device, a heating passage, an aggregate device and an adjustable DC (direct current) power supply, wherein:

the heating passage is sealed with a high-temperature resistant insulating material all around, two ends of the heating passage are connected with the feeding device and the aggregate device respectively;

a control valve for adjusting a flow rate of the granular activated carbon is provided at an outlet of the heating passage;

two electrode plates, which are placed in parallel and same in shape, are provided within the heating passage;

the two electrode plates are connected with an output positive pole and an output negative pole of the DC power supply respectively.

The present invention has some beneficial effects as follows.

(1) The present invention provides a method for regenerating granular activated carbon by arc initiation and discharge. The flowing granular activated carbon is energized to trigger electric arcs, the activated carbon is efficiently heated through the dual effects of conductive Joule heating and arc heat release of the activated carbon, thereby realizing high-temperature thermal regeneration. The method provided by the present invention is suitable for continuous process industries, and also greatly reduces energy dissipation, saving energy and protecting the environment. Further, the voltage formula provided by the present invention is able to conveniently and directly calculate the voltage of the DC according to the target temperature rise value; and under the action of the calculated voltage of the DC, the activated carbon is able to more accurately reach the target temperature rise value, thereby providing an accurate and efficient approach for high-temperature thermal regeneration of activated carbon. Moreover, when the voltage of the DC, which is calculated according to the target temperature rise value, is higher than the preset high value (such as 380 V), or when the input power, which is calculated according to the voltage of the DC, exceeds the rated power of the DC power supply, the voltage of the DC and the input power are reduced by reducing the mass flow of the granular activated carbon in the heating passage; on the contrary, when the voltage of the DC, which is calculated according to the target temperature rise value, is lower than the preset low value, the efficiency and the capacity of the granular activated carbon are increased by increasing the mass flow. Therefore, it is able to be seen that the voltage formula provided by the present invention has certain adjustability and is less difficult to implement.

(2) In the present invention, dynamic contact and separation are generated by flow of the granular activated carbon, forced discharge is produced to trigger arcs after power-on, which greatly reduces the resistance of the activated carbon access circuit, improves the electrical conductivity, so that the activated carbon, that adsorbs a large amount of substances and has high resistivity resulting from practical industrial applications, is able to be regenerated through the method provided by the present invention. Therefore, the application range of activated carbon regeneration is expanded, and the present invention has more industrial applicability.

(3) The arc discharge technology of the present invention solves the problem that the activated carbon with high resistivity is able to be turned on only when high-voltage electricity is loaded in the direct heating method, thereby avoiding that a large amount of energy waste and even the activated carbon is broken down and burned.

DETAILED DESCRIPTION OF THE PREFERRED EMBODIMENT

The present invention will be further explained in detail with the accompanying drawings as follows.

First Embodiment

Figure 1:
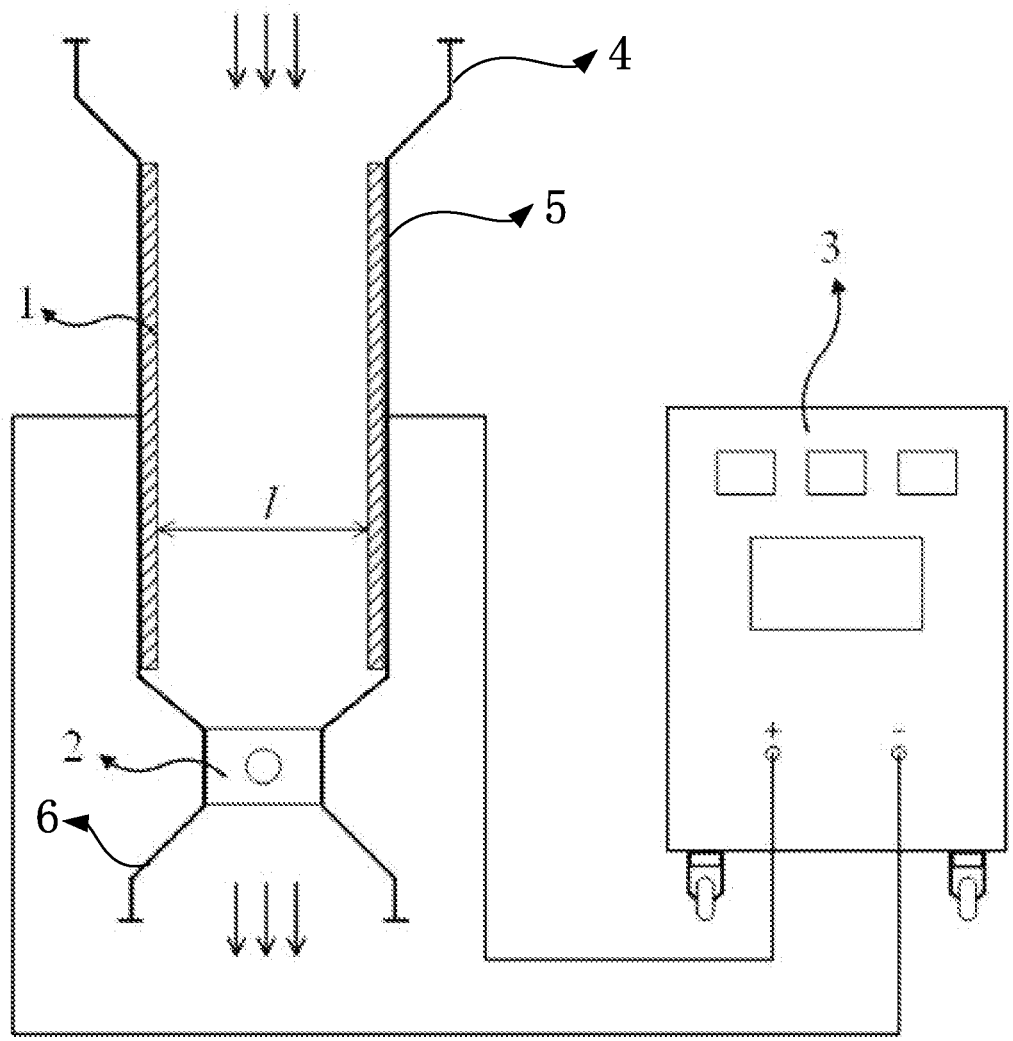
FIG. 1 is a structurally schematic diagram of a device for regenerating granular activated carbon by arc initiation and discharge provided by the present invention.

Referring to FIG. 1, a device for regenerating granular activated carbon by arc initiation and discharge according to a first embodiment of the present invention is illustrated, which comprises a feeding device 4, a heating passage 5, an aggregate device 6 and an adjustable DC (direct current) power supply 3, wherein the heating passage 5 is sealed with a high-temperature resistant insulating material all around, two ends of the heating passage 5 are connected with the feeding device 4 and the aggregate device 6 respectively; a control valve 2 for adjusting a flow rate of activated carbon is provided at an outlet of the heating passage 5; two electrode plates 1 (which are embodied as flat electrode plates), which are placed in parallel and same in shape, are fixed within the heating passage 5; the two electrode plates 1 are connected with an output positive pole and an output negative pole of the DC power supply 3.

Preferably, a distance l between the two electrode plates 1 is 0.05 m, a facing width w (which is an effective width of the two electrode plates 1 facing each other) is 0.12 m, and an area S of each of the two electrode plates 1 is 0.0036 m².

Preferably, the two electrode plates 1 are fixed within the heating passage 5; or one of the two electrode plates 1 is fixed within the heating passage 5, another of the two electrode plates 1 is driven by a sidesway mechanism, the sidesway mechanism and the one of the two electrode plates 1 are synchronously driven by a spacing adjustment mechanism, the sidesway mechanism is configured to adjust a relative area of the two electrode plates 1 for changing a width of the two electrode plates 1 facing each other, the spacing adjustment mechanism is configured to adjust a distance between the two electrode plates 1.

Second Embodiment

According to a second embodiment of the present invention, a method for regenerating granular activated carbon by arc initiation and discharge with the device described in the first embodiment of the present invention is illustrated, wherein an inlet of the heating passage is connected with the feeding device, and an outlet of the heating passage is connected with the aggregate device.

The method for regenerating granular activated carbon by arc initiation and discharge comprises steps of:

(A) after drying the granular activated carbon until a moisture content thereof is lower than 5%, and the dried activated carbon continuously flowing through the heating passage by inputting the dried activated carbon into the heating passage with the feeding device; and (B) applying a direct current to the two electrode plates, wherein a voltage of the direct current is expressed by a voltage formula of $$U = \sqrt{\eta \rho c q_m \Delta T \left(1 + \frac{2q_m}{\alpha + q_m} + \beta d_p\right) \frac{l}{S}},$$

here, $\rho$ is resistivity of the granular activated carbon, c is specific heat capacity of the granular activated carbon, $q_m$ is mass flow of the granular activated carbon in the heating passage, $\Delta T$ is target temperature rise value of regenerated activated carbon, $d_p$ is equivalent particle size of the granular activated carbon, l is distance between the two electrode plates, S is area of each of the two electrode plates, $\eta$ is a dimensionless coefficient in a range of 1 to 5, $\alpha$ is an empirical parameter which is expressed by a formula of $\alpha = xwl\rho_m$ and has a unit of kg/s, here, x is an adjustment parameter with dimension m/s and is in range of 0.002 m/s to 0.01 m/s, w is facing width of the two electrode plates, $\rho_m$ is bulk density of the granular activated carbon, $\beta$ is an empirical parameter in a range of 200 m$^{-1}$ to 800 m$^{-1}$, wherein:

the granular activated carbon tumbles, collides and separates with each other in the heating passage during transportation, electrons are excited to pass through a potential barrier to form field emission and impact ionization, resulting in arc initiation; the arc initiation is conducive to current conduction and heat release, and greatly reduces the resistance of an activated carbon access circuit, so as to make activated carbon with high static resistivity discharge to be heated by dynamic arc initiation, so that under a combined action of conductive Joule heating and arc heat release, the activated carbon heats up rapidly and an adsorbate is pyrolyzed by high temperature, thereby achieving regeneration; the regenerated granular activated carbon is collected by the aggregate device.

A specific example is as below.

Figure 2:
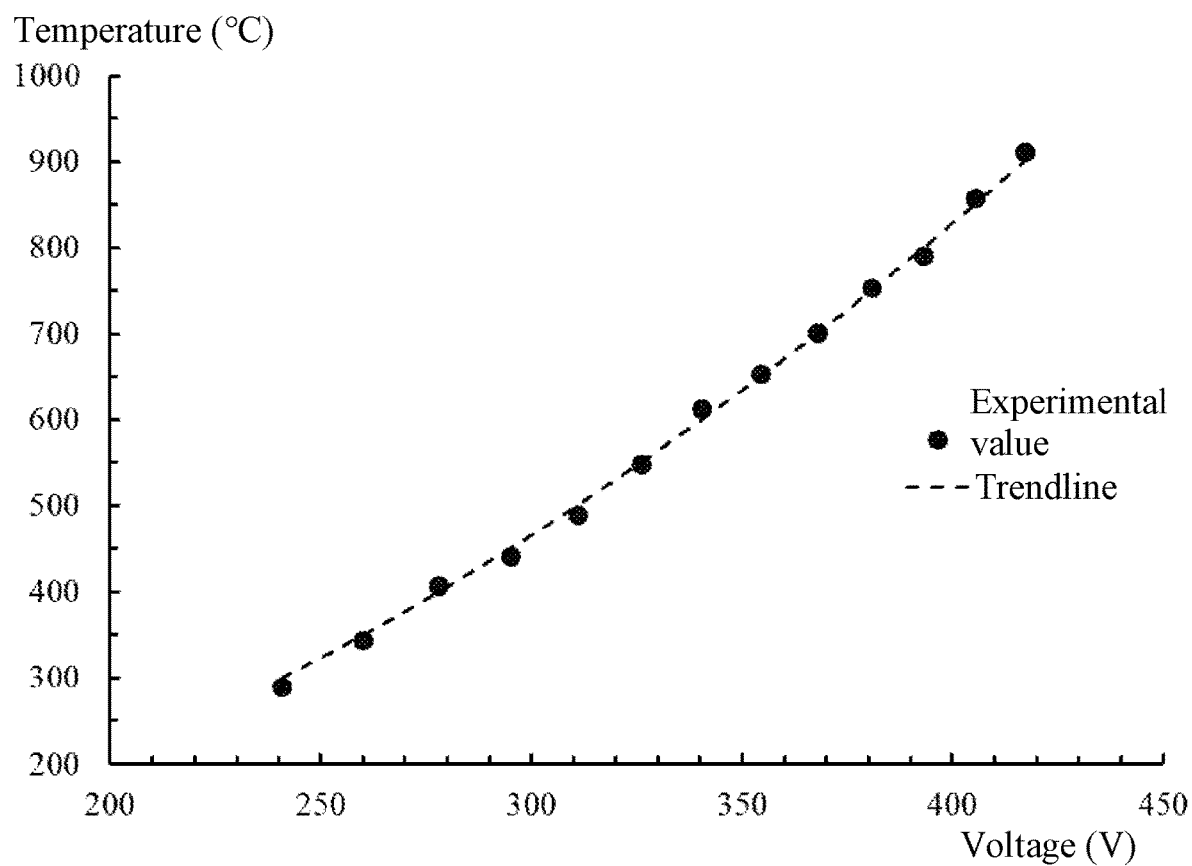
FIG. 2 is a graph of actual temperature rise versus voltage according to the second embodiment of the present invention.

The activated carbon has the resistivity $\rho$ of 0.6 $\Omega$·m, the specific heat capacity c of 840 J/(kg° C.), the bulk density $\rho_m$ of 470 kg/m$^3$, the equivalent particle size $d_p$ of 0.002 m, the target temperature rise value $\Delta T$ of 700° C., the mass flow $q_m$ of 0.006 kg/s, $\eta=2$, x=0.00638 m/s, $\alpha=0.018$ kg/s, $\beta=400$ m$^{-1}$. Accordingly, the calculated voltage of the DC is 367.7 V. However, if the voltage of the DC is changed under the above parameters, the graph of actual temperature rise versus voltage is shown in FIG. 2.

Preferably, a specific measurement process of the bulk density $\rho_m$ of the granular activated carbon comprises steps of (a) since the bulk density of the granular activated carbon is a ratio of mass to volume under natural accumulation of the activated carbon, placing the granular activated carbon into a 100 mL of graduated cylinder several times, gently tapping a bottom of the graduated cylinder with a rubber hammer after each placement until a volume of the granular activated carbon reaches 100 mL and no longer decreases; (b) and then weighing out a net weight of the granular activated carbon in the graduated cylinder with an electronic scale; and (c) finally dividing the net weight of the activated carbon by the volume of 100 mL to obtain the bulk density of the granular activated carbon. The measurement process of the bulk density $\rho_m$ of the granular activated carbon only uses the volume of 100 mL, coupled with the limited accuracy of manual operation, there will be measurement errors, but the measurement error of the bulk density $\rho_m$ is able to be adjusted by the coefficient x.

The working principle of regenerating the granular activated carbon by arc initiation and discharge of the present invention is further described as below.

The granular activated carbon in the electrified state tumbles, collides and separates with each other during motion, electrons are excited to pass through the potential barrier to form field emission and impact ionization, resulting in a large number of arcs. The large number of arcs are conducive to current conduction and heat release, and simultaneously a large amount of energy is released in the form of light and heat, which further stimulates the conductive particles to generate photoionization and thermal ionization, thereby promoting the formation of more arcs. This forced discharge effect significantly improves the current conduction performance and greatly reduces the resistance of the activated carbon access circuit, so that the activated carbon with high static resistivity can is also able to be heated by dynamic arc initiation. Therefore, under the combined action of conductive Joule heating and arc heat release, the activated carbon heats up rapidly and the adsorbate is pyrolyzed by high temperature, thereby achieving regeneration. The actual arcing discharge effect is related to the loaded voltage and current, the moving speed of the activated carbon, the particle size of the activated carbon, and the electrical properties of the activated carbon itself. The larger the loaded voltage and current, the smaller the moving speed of the activated carbon after exceeding the critical value of the moving speed, the smaller the particle size of the activated carbon after exceeding the critical value of the particle size, and the lower the resistivity of the activated carbon, the better the arc initiation effect. Under certain other conditions, when the flow rate of the activated carbon becomes larger (for example, to increase the production capacity), or the equivalent particle size of the activated carbon becomes larger, in order to make the activated carbon heat up to the target temperature, it is necessary to increase the loaded voltage, and the voltage of the DC is able to be easily obtained by the voltage formula provided by the present invention of $$U = \sqrt{\eta \rho c q_m \Delta T \left(1 + \frac{2q_m}{\alpha + q_m} + \beta d_p\right) \frac{l}{S}}.$$

What is claimed is:

1. A method for regenerating granular activated carbon by arc initiation and discharge, the method comprising steps of:
   the granular activated carbon continuously flowing through a heating passage; and
   applying a DC (direct current) to two electrode plates in the heating passage, wherein a voltage of the DC is expressed by a voltage formula of $$U = \sqrt{\eta \rho c q_m \Delta T \left(1 + \frac{2q_m}{\alpha + q_m} + \beta d_p\right) \frac{l}{S}},$$

here, $\rho$ is resistivity of the granular activated carbon, c is specific heat capacity of the granular activated carbon, $q_m$ is mass flow of the granular activated carbon in the heating passage, $\Delta T$ is target temperature rise value of regenerated activated carbon, $d_p$ is equivalent particle size of the granular activated carbon, l is distance between the two electrode plates, S is area of each of the two electrode plates, $\eta$ is a dimensionless coefficient in a range of 1 to 5, $\alpha$ is an empirical parameter which is expressed by a formula of $\alpha = xwl\rho_m$ and has a unit of kg/s, here, x is an adjustment parameter with dimension m/s and is in range of 0.002 m/s to 0.01 m/s, w is facing width of the two electrode plates, $\rho_m$ is bulk density of the granular activated carbon, $\beta$ is an empirical parameter in a range of 200 $m^{-1}$ to 800 $m^{-1}$, wherein:

the granular activated carbon tumbles, collides and separates with each other in the heating passage during transportation, electrons are excited to pass through a potential barrier to form field emission and impact ionization, resulting in arc initiation;

the arc initiation is conducive to current conduction and heat release, and reduces the resistance of an activated carbon access circuit, so that under a combined action of conductive Joule heating and arc heat release, the activated carbon heats up and an adsorbate is pyrolyzed, thereby achieving regeneration.

2. The method according to claim 1, wherein a measurement process of the bulk density $\rho_m$ of the granular activated carbon comprises steps of (a) placing the granular activated carbon into a 100 mL of graduated cylinder several times, tapping a bottom of the graduated cylinder with a rubber hammer after each placement until a volume of the granular activated carbon reaches 100 mL and no longer decreases; (b) and then weighing out a net weight of the granular activated carbon in the graduated cylinder with an electronic scale; and (c) finally dividing the net weight of the granular activated carbon by the volume of 100 mL to obtain the bulk density of the granular activated carbon.

3. The method according to claim 1, wherein when the voltage of the DC, which is calculated according to the target temperature rise value, is higher than a preset value, or when an input power, which is calculated according to the voltage of the DC, exceeds a rated power of a DC power supply, the voltage of the DC and the input power are reduced by reducing the mass flow $q_m$ of the granular activated carbon in the heating passage; on the contrary, when the voltage of the DC, which is calculated according to the target temperature rise value, is lower than a preset low value, an efficiency and a capacity of the granular activated carbon are increased by increasing the mass flow $q_m$, wherein $q_m = vwl\rho_m$, here, v is flow rate of the granular activated carbon in a range of 0.0005 m/s to 0.02 m/s, and therefore, the mass flow $q_m$ is able to be adjusted by controlling the flow rate v of the granular activated carbon, changing the distance/between the two electrode plates and the facing width w of the two electrode plates.

4. The method according to claim 1, wherein the equivalent particle size of the granular activated carbon is in a range of 0.5 mm to 10 mm.

5. The method according to claim 1, wherein a moisture content of the granular activated carbon is less than 5%.

\* \* \* \* \*